(12) United States Patent
Sakomizu

(10) Patent No.: US 11,025,920 B2
(45) Date of Patent: Jun. 1, 2021

(54) ENCODING DEVICE, DECODING DEVICE, AND IMAGE PROCESSING METHOD

(71) Applicant: Oki Electric Industry Co., Ltd., Tokyo (JP)

(72) Inventor: Kazuhito Sakomizu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 16/675,719

(22) Filed: Nov. 6, 2019

(65) Prior Publication Data

US 2020/0322616 A1 Oct. 8, 2020

(30) Foreign Application Priority Data

Apr. 3, 2019 (JP) .............................. JP2019-071514

(51) Int. Cl.
*H04N 19/167* (2014.01)
*H04N 19/117* (2014.01)
*H04N 19/182* (2014.01)

(52) U.S. Cl.
CPC ......... *H04N 19/167* (2014.11); *H04N 19/117* (2014.11); *H04N 19/182* (2014.11)

(58) Field of Classification Search
CPC ... H04N 19/117; H04N 19/167; H04N 19/182
See application file for complete search history.

(56) References Cited

U.S. PATENT DOCUMENTS

2002/0059520 A1* 5/2002 Murakami ............ G06T 1/0028
713/176

2007/0113242 A1* 5/2007 Fetkovich .............. H04N 19/85
725/19

(Continued)

FOREIGN PATENT DOCUMENTS

| JP | H04-219089 A | 8/1992 |
|----|--------------|--------|
| JP | 2009-049979 A | 3/2009 |
| JP | 2009-188792 A | 8/2009 |

OTHER PUBLICATIONS

Kazuhito Sakomizu et al., "Filtering Scheme for ROI Coding by Dynamic Range Compression and Updating Source Picture Filter," Proceedings of the 4th IIAE International Conference on Intelligent Systems and Image Processing 2016.

*Primary Examiner* — Joon Kwon
(74) *Attorney, Agent, or Firm* — Rabin & Berdo, P.C.

(57) ABSTRACT

An encoding device sets a region of interest corresponding to an input image, and prepares, as an intermediate image, data in which the input image is associated with region-of-interest information, designates an embedding position, embeds the region-of-interest information in a pixel value form into the intermediate image in accordance with the embedding position, prepares, as a region-of-interest setting image, data associated with the region-of-interest information, encodes the image by using a predetermined image coding scheme, and outputs an encoded image. A decoding device analyzes a decoded image obtained through decoding, reads the region-of-interest information, prepares, as a region-of-interest information read image, data in which the decoded image is associated with the region-of-interest information, applies a post-filter on the basis of the region-of-interest information read image, and outputs a post-filtered image.

18 Claims, 13 Drawing Sheets

(56) References Cited

U.S. PATENT DOCUMENTS

| | | | |
|---|---|---|---|
| 2008/0008378 A1* | 1/2008 | Andel | G06K 9/6292 |
| | | | 382/141 |
| 2009/0202169 A1 | 8/2009 | Hayashi | |
| 2010/0119156 A1 | 5/2010 | Noguchi et al. | |

* cited by examiner

ENCODING DEVICE, DECODING DEVICE, AND IMAGE PROCESSING METHOD

CROSS REFERENCE TO RELATED APPLICATION(S)

This application is based upon and claims benefit of priority from Japanese Patent Application No. 2019-071514, filed on Apr. 3, 2019, the entire contents of which are incorporated herein by reference.

BACKGROUND

The present invention relates to an encoding device, a decoding device, and an image processing method. For example, the present invention is applicable to an image processing system that compresses and encodes an image or a video, and decodes the encoded image or video.

In recent years, surveillance cameras have been widespread, and it is desired for the surveillance cameras to achieve higher resolution, a higher frame rate, and multi viewpoints. However, the higher resolution, the higher frame rate, and the multi viewpoints cause significant increase in code amount of a moving image, and cause increase in communication cost and storage cost. To alleviate this problem, there has been proposed schemes that detect a region of interest in the moving image and allocate a large number of bits to the region of interest. Note that, here the region of interest means a region such as a face region, for example. Hereinafter, the region of interest is referred to as an "ROI", which is an abbreviation for the region of interest. In addition, a scheme that allocates a large number of bits to a region of interest is referred to as "ROI coding".

JP 2009-049979A proposes a system configuration of reducing information amount of a non ROI, which is a region other than an ROI, to less than information amount of the ROI by using a function of an encoder to which parameters for controlling code amount and video quality are provided for respective blocks, and controlling the parameters to be provided to the encoder for the respective blocks.

As described above, when information amount is reduced by using the function provided by the encoder, it is possible to reduce the code amount efficiently and certainly. Popular standards such as H.264/MPEG-4 AVC or H.265/MPEG-H HEVC achieve functions of controlling video quality in each region. Therefore, use of such a function is a typical way to allocate a large number of bits to an ROI.

However, it is impossible to embrace the above-described way in the case where it is necessary to use an encoder that does not have the function of providing video quality control parameters for respective blocks, due to cost, compatibility, or the like, for example. JP H04-219089A (JP 3046379B) and "Filtering Scheme for ROI Coding by Dynamic Range Compression and Updating Source Picture Filter, Proceedings of the 4th IIAE International Conference on Intelligent Systems and Image Processing 2016" (Non Patent Literature 1) are proposed as technologies capable of controlling video qualities in respective regions without depending on the encoder in such a case.

To reduce information amount of a non ROI without depending on an encoder, JP H04-219089A (JP 3046379B) proposes to perform preprocessing on the non ROI by using a low-pass filter, remove information regarding a high-frequency component, and suppress the information amount of the non ROI.

To reduce information amount of a non ROI without depending on an encoder, Non Patent Literature 1 proposes to suppress information amount of the non ROI by performing filtering that limits a dynamic range of a pixel signal of the non ROI.

FIG. 13 illustrates a configuration example of an image processing system represented by Non Patent Literature 1.

With reference to FIG. 13, an image processing system Z includes an image encoding system X1 and an image decoding system X2. The image encoding system X1 receives an input image as an input, compresses pixels belonging to a non ROI in the input image by using a smaller number of bits than information regarding an ROI, and outputs them as a bitstream. The image decoding system X2 receives the bitstream as an input, decodes the bitstream, and output an output image.

The image encoding system X1 includes an ROI information setting unit U1 and an encoder unit U3. The ROI information setting unit U1 decides ROI information regarding the input image, outputs, as an ROI setting image, data in which the input image is associated with the ROI information, and outputs the ROI information to the image decoding system X2 via a communication channel or the like. The encoder unit U3 performs ROI encoding on the ROI setting image and outputs a bitstream. Here, the ROI information is information including the number of ROIs or coordinate information regarding the respective ROIs, for example.

The encoder unit U3 includes a pre-filtering unit 405 and an encoder core unit 406. For example, the pre-filtering unit 405 specifies pixels belonging to the non ROI on the basis of the ROI information, performs filtering for limiting (suppressing) a dynamic range on the pixels belonging to the non ROI in the input image, and outputs a pre-filtered image. The encoder core unit 406 compresses the pre-filtered image by using an image coding scheme such as H.264/MPEG-4AVC and outputs the bitstream.

Here, the process of limiting a dynamic range of a pixel signal includes a case where the pixel signal is limited to a fixed value such as 128. Setting the pixel signal to a fixed value is equivalent to setting the dynamic range to 1.

The ROI information setting unit U1 is a function of setting an ROI corresponding to the input image. However, a means for specifying the ROI is not specifically limited.

For example, it is possible to use a method of applying a face detection algorithm, a person detection algorithm, a vehicle registration plate detection algorithm, a vehicle body detection algorithm, or the like to an input image, detecting a position and a size of an ROI in the input image, and specifying the ROI. Alternatively, for example, it is possible to use a method of specifying an ROI on the basis of a position and a size of the ROI that are manually input in advance, or it is possible to use a method of specifying an ROI on the basis of a position and a size of the ROI that are input through a user interface. As a further alternative, for example, it is possible to use a method of specifying an ROI by utilizing an infrared camera image, a depth camera image, or the like corresponding to the input image.

The image decoding system X2 includes a decoder unit 407, an ROI information reading unit 408, and a post-filtering unit 409. The decoder unit 407 decodes the bitstream by using a scheme compatible with the encoder core unit 406, and outputs a decoded image. The ROI information reading unit 408 reads ROI information regarding the decoded image by receiving the ROI information from the image coding system X1 via the communication channel or the like, and outputs, as an ROI read image, data in which the decoded image is associated with the ROI information. The post-filtering unit 409 applies a post-filer on the basis of the ROI read image and outputs a post-filtered image.

For example, the post-filtering unit 409 specifies the pixels belonging to the non ROI on the basis of the ROI information, performs filtering (equivalent to amplification of amplitude of a signal) for restoring the dynamic range on the pixels belonging to the non ROI in the decoded image, and outputs a post-filtered image.

Note that, the above-described example is an example in which the pre-filtering unit 405 of the image coding system X1 reduces the information amount of the non ROI to less than the information amount of the ROI. However, when the encoder unit U3 of the image encoding system X1 is replaced with a unit that allocates a large number of bits to the ROI by using a function of encoder that controls video qualities of respective region, it is possible to achieve a configuration example in which a video coding engine capable of performing ROI coding represented by Non Patent Literature 1 is installed.

Therefore, the post-filtering unit 409 is still useful even in the configuration example in which the video coding engine capable of performing ROI coding is installed. In the case of using the video coding engine capable of performing ROI coding, for example, a quantization step size of the non ROI becomes expanded. This results in occurrence of many block distortions in the non ROI. To handle this problem, for example, it is possible to use a method of applying a low-pass filter to only the non ROI. If the low-pass filter is applied to an ROI that is encoded with high quality, this causes image quality deterioration. Therefore, it is effective to apply the low-pass filter to only the non ROI that includes much noise.

SUMMARY

As described above, it is possible to allocate a large number of bits to an ROI when image qualities becomes different between a non ROI and the ROI by using the encoder unit U3. In addition, when using the post-filtering unit 409, it is also possible to restore the video quality of the non ROI.

For a system that necessarily or desirably performs post-filtering on a non ROI, it is necessary to input a decoded image and ROI information to the post-filtering unit 409 in synchronization with each other. In an environment in which it is possible to multiplex ROI information into a bitstream, it is possible to use various kinds of means for making synchronization. However, it is difficult to make synchronization when, for example, using a system in which a fixed system or standard for coding and communicating a video is provided and it is impossible to make a change to a bitstream, such as WebRTC (Web Real-Time Communication), which is a video communication system installed in browsers.

It is also possible to take into consideration a solution that transmits ROI information through a different channel from a bitstream and synchronizes a decoded image with the ROI information in the image decoding system X2. However, synchronization of pieces of information transmitted through different channels requires buffering of the decoded image or the ROI information, and this causes problems of delay and the like.

In addition, if data is lost through one of the channels, it is difficult to match the decoded image and the ROI information in their correspondence relation.

Therefore, in a nod to the above-described problems, the present invention provides an encoding device, a decoding device, and an image processing method that make it possible to read ROI information of a decoded image without synchronizing the ROI information with the decoded image, and to match the decoded image and the ROI information in their correspondence relation even in the case where data is lost in a communication channel or the like.

The first invention of an encoding device that encodes an input image, the encoding device including (1) a region-of-interest information setting execution unit configured to set a region of interest corresponding to the input image, and output, as an intermediate image, data in which the input image is associated with region-of-interest information, (2) an embedding position designation unit configured to designate an embedding position of the region-of-interest information in the intermediate image, (3) a region-of-interest information embedding unit configured to embed the region-of-interest information in a pixel value form into the intermediate image in accordance with the embedding position, and output, as a region-of-interest setting image, the intermediate image into which the region-of-interest information is embedded and (4) an encoding unit configured to encode the region-of-interest setting image by using a predetermined image coding scheme, and output an encoded image.

The second invention of a decoding device that decodes an encoded image obtained by using a predetermined image coding scheme and encoding an image into which region-of-interest information in a pixel value form is embedded, the decoding device including, (1) a decoding unit configured to decode the encoded image and output a decoded image, (2) a region-of-interest information reading unit configured to analyze the decoded image, read the region-of-interest information, output, as a region-of-interest information read image, data in which the decoded image is associated with the region-of-interest information and (3) a post-filtering unit configured to apply a post-filter on a basis of the region-of-interest information read image, and output a post-filtered image.

The third invention of an image processing system including the encoding device according to the first invention, and the decoding device according to the second invention.

The fourth invention of an image processing method of an image processing system including an encoding device and a decoding device, wherein, (1) in the encoding device, (1-1) a region-of-interest information setting execution unit sets a region of interest corresponding to an input image, and outputs, as an intermediate image, data in which the input image is associated with region-of-interest information, (1-2) an embedding position designation unit designates an embedding position of the region-of-interest information in the intermediate image, (1-3) a region-of-interest information embedding unit embeds the region-of-interest information in a pixel value form into the intermediate image in accordance with the embedding position, and outputs, as a region-of-interest setting image, the intermediate image into which the region-of-interest information is embedded, and (1-4) an encoding unit encodes the region-of-interest setting image by using a predetermined image coding scheme, and outputs an encoded image obtained through the encoding, and, (2) in the decoding device, (2-1) a decoding unit decodes the encoded image obtained from the encoding device and outputs a decoded image, (2-2) a region-of-interest information reading unit analyzes the decoded image, reads the region-of-interest information, outputs, as a region-of-interest information read image, data in which the decoded image is associated with the region-of-interest information, and (2-3) a post-filtering unit applies a post-filter on a basis of the region-of-interest information read image, and outputs a post-filtered image.

According to the present invention, it is possible to read ROI information of a decoded image without synchronizing the ROI information with the decoded image, and to match the decoded image and the ROI information in their correspondence relation even in the case where data is lost in a communication channel or the like.

DETAILED DESCRIPTION OF THE EMBODIMENT(S)

Figure 1:
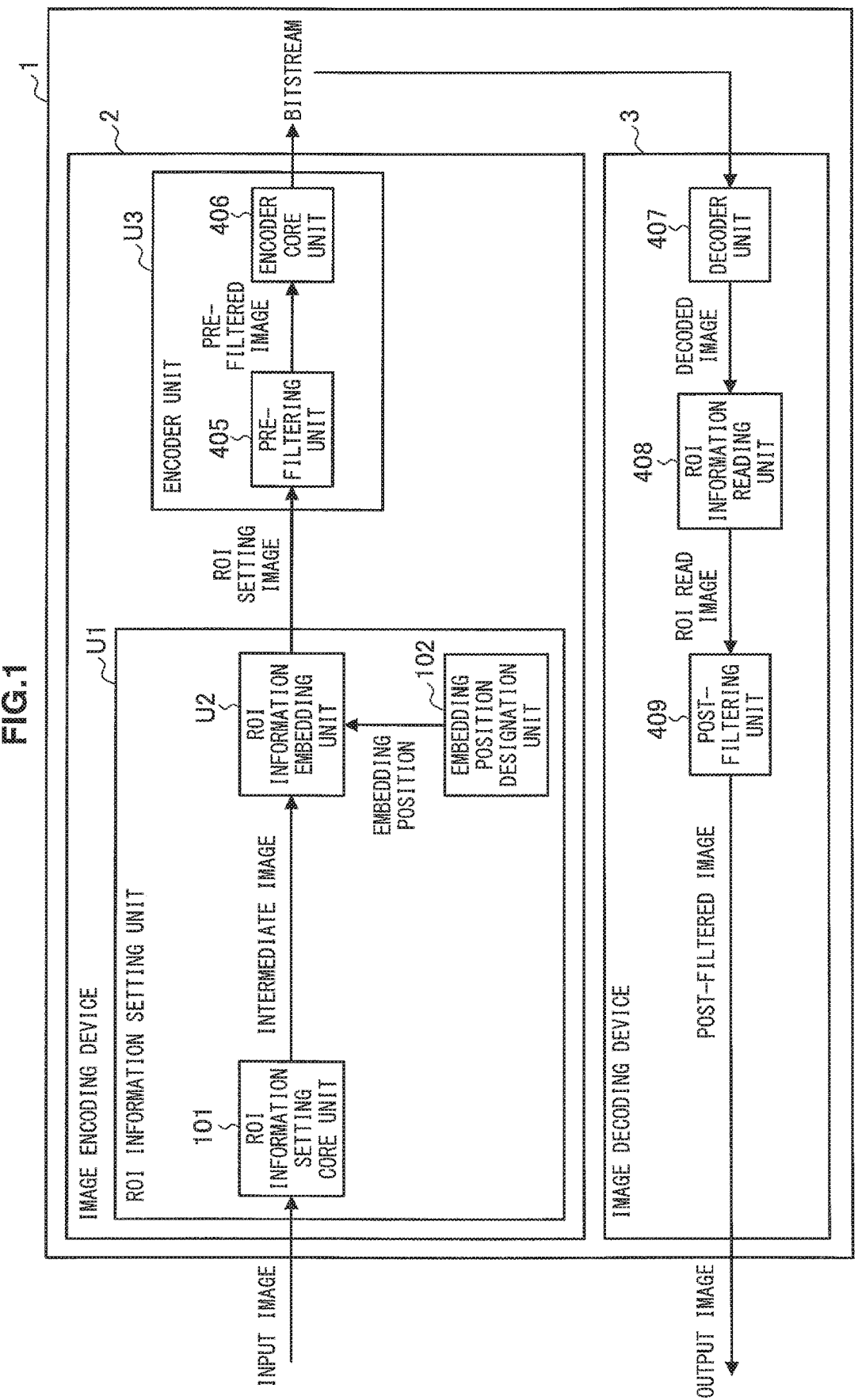
FIG. 1 is a configuration diagram illustrating a configuration of an image processing system according to a first embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(A) First Embodiment

Hereinafter, a first embodiment of the encoding device, the decoding device, the image processing system, and the image processing method according to the present invention will be described with reference to drawings.

(A-1) Configuration According to First Embodiment

[Image Processing System]

FIG. 1 is a configuration diagram illustrating a configuration of an image processing system according to the first embodiment.

With reference to FIG. 1, an image processing system 1 according to the first embodiment includes an image encoding device 2 and an image decoding device 3. The image encoding device 2 encodes an input image and outputs a stream (a bitstream). The image decoding device 2 decodes the stream (the bitstream) encoded by the image encoding device 2 and outputs a decoded image.

With regard to the image processing system 1, a medium that inputs the stream output from the image encoding device 2 to the image decoding device 3 is not limited. For example, a communication line (such as a communication line represented by the Internet or the like, for example) may transmit the stream output from the image encoding device 2 to the image decoding device 3. Alternatively, data of the stream output from the image encoding device 2 may be recorded on a data recording medium (such as a recording medium like a DVD or an HDD, for example) and may be input to the image decoding device 3 offline.

In this embodiment, the image encoding device 2 is described as a device that encodes input images one by one. However, the present invention may be applicable to a moving image encoding process that causes the image encoding device 2 to sequentially process a plurality of input images. In addition, in a similar way, the present invention may be applicable to a moving image decoding process that causes the image decoding device 3 to sequentially perform a decoding process on a stream of a plurality of pieces of encoded data.

Next, an internal configuration of the image encoding device 2 will be described. The image encoding device 2 may be configured as hardware (for example, a dedicated semiconductor chip or the like). Alternatively, a part or all of the image encoding device 2 may be configured as software.

The image encoding device 2 roughly includes an ROI information setting unit U1 and an encoder unit U3. The ROI information setting unit U1 includes an ROI information setting core unit (also referred to as an "ROI information setting execution unit") 101, an embedding position designation unit 102, and an ROI information embedding unit U2. The encoder unit U3 includes a pre-filtering unit 405 and an encoder core unit (also referred to as an "encoder execution unit").

The ROI information setting core unit 101 decides ROI information regarding an input image, and outputs data in which the input image is associated with the ROI information, to the ROI information embedding unit U2 as an intermediate image.

The ROI information setting unit U1 is a function of setting an ROI corresponding to the input image. However, a means for specifying the ROI is not specifically limited. For example, it is possible to use a method of applying a face detection algorithm, a person detection algorithm, a vehicle registration plate detection algorithm, a vehicle body detection algorithm, or the like to the input image, detecting a position and a size of an ROI in the input image, and specifying the ROI. Alternatively, for example, it is possible to use a method of specifying an ROI on the basis of a position and a size of the ROI that are manually input in advance, or it is possible to use a method of specifying an ROI on the basis of a position and a size of the ROI that are input through a user interface. As a further alternative, for example, it is possible to use a method of specifying an ROI by utilizing an infrared camera image, a depth camera image, or the like corresponding to the input image.

The embedding position designation unit 102 designates an embedding position of the ROI information to be embedded into the intermediate image, for the ROI information embedding unit U2.

The ROI information embedding unit U2 embeds the ROI information in a pixel value form into the intermediate image in accordance with the embedding position designated by the embedding position designation unit 102, and outputs data further associated with the ROI information to the encoder unit U3 as an ROI setting image.

Note that, details of the embedding position of the ROI information, a method of embedding the ROI information, and the like will be described in paragraphs related to operation.

The pre-filtering unit 405 acquires the ROI setting image from the ROI information setting unit U1, specifies pixels belonging to a non ROI on the basis of the ROI information, performs filtering for limiting (suppressing) a dynamic range on the pixels belonging to the non ROI in the input image, and outputs a pre-filtered image. Here, the process of limiting a dynamic range of a pixel signal includes a case where the pixel signal is limited to a fixed value such as 128. Setting the pixel signal to a fixed value is equivalent to setting the dynamic range to 1.

The encoder core unit 406 uses an image coding scheme such as H.264/MPEG-4AVC, for example, compresses the pre-filtered image obtained from the pre-filtering unit 405, and outputs a bitstream.

Next, a configuration of the image decoding device 3 will be described. The image decoding device 3 may also be configured as hardware (for example, dedicated semiconductor chip or the like). Alternatively, a part or all of the image decoding device 3 may also be configured as software.

The image decoding device 3 includes a decoder unit 407, an ROI information reading unit 408, and a post-filtering unit 409.

The decoder unit 407 decodes the input bitstream by using a scheme compatible with the encoder core unit 407, and outputs a decoded image to the ROI information reading unit 408.

The ROI information reading unit 408 analyzes the decoded image obtained from the decoder unit 407, reads the ROI information, outputs data in which the decoded image is associated with the ROI information, to the post-filtering unit 409 as an ROI read image. Note that, details of a method of reading the ROI information will be described in paragraphs related to operation.

The post-filtering unit 409 applies a post-filter on the basis of the ROI read image, and outputs a post-filtered image.

(A-2) Operation According to First Embodiment

Next, operation of the image processing method performed by the image processing system 1 according to the first embodiment will be described. Hereinafter, operation of an image process performed by the image encoding device 2 and operation of an image process performed by the image decoding device 3 will be described separately.

(A-2-1) Operation of Image Encoding Device

Figure 2:
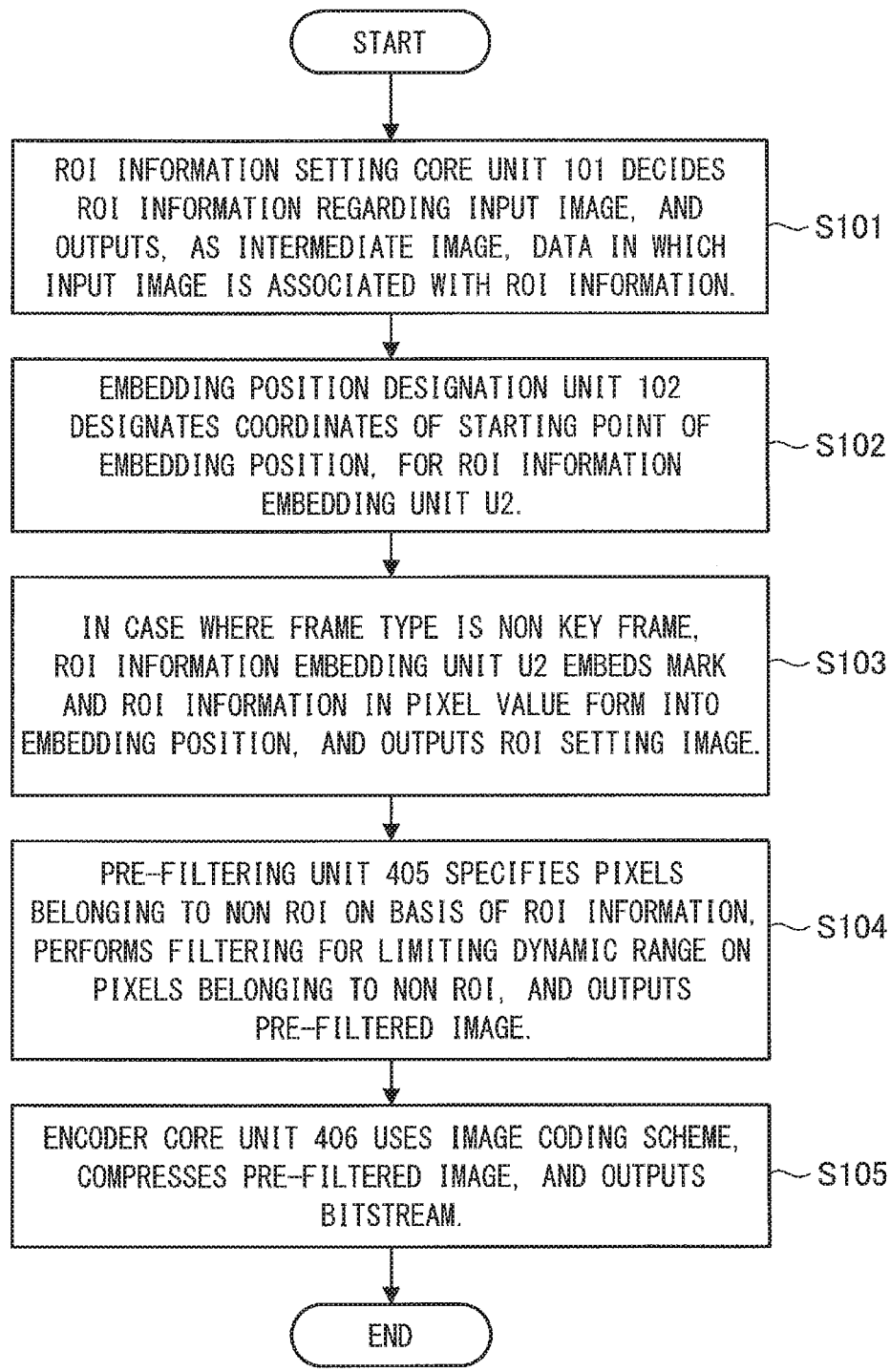
FIG. 2 is a flowchart illustrating an image process performed by an image encoding device according to the first embodiment.

FIG. 2 is a flowchart illustrating image processing operation performed by the image encoding device 2.
[Step S101]
The ROI information setting core unit 101 decides ROI information regarding an input image, and outputs, as an intermediate image, data in which the input image is associated with the ROI information.

Here, the ROI information is information including the number of ROIs, coordinate information regarding the respective ROIs, frame types, and the like. The ROI coordinate information is, for example, information indicating positions of the respective ROIs. For example, the ROI coordinate information is information indicating coordinate positions, ranges, sizes, and the like of ROIs in an image.

The frame type is information for distinguishing a key frame from a non key frame, in the case where one or more images in an image group are classified into an "image that consists of an ROI(s) and is referred to as the key frame" and an "image that is other than the key frame and is referred to as the non key frame". Note that, as described later, the frame type is for facilitating effects of the present invention more. Therefore, the present invention is also effective even in the case where the frame type is not a part of the ROI information.
[Step S102] The embedding position designation unit 102 designates coordinates of a starting point of an embedding position, for the ROI information embedding unit U2.

For example, in a simplest example, the embedding position designation unit 102 designates an origin in an image coordinate system, as coordinates of a starting point of an embedding position. In the case where the origin of the image coordinate system is set to a pixel in an upper left corner of an image, the pixel in the upper left corner of the image is designated as the starting point for embedding ROI information.

The present invention is effective even in the case where the embedding position is any position in an image. However, in particular, an optimal embedding position is a lower right corner of the image. A second optimal embedding position is a lower left corner or an upper right corner. Reasons thereof will be described later.

Note that, the present invention is also effective even in the case where f Step S101 and Step S102 are performed in reverse order.
[Step S103]
The ROI information embedding unit U2 determines whether or not the frame type is the non key frame on the basis of the ROI information. Next, in the case where the frame type is the non key frame, the ROI information embedding unit U2 embeds a mark and the ROI information in the pixel value form into the designated embedding position, and outputs an ROI setting image. Details of a method of embedding the mark and the ROI information into the intermediate image will be described later.

Note that, as described above, the case where the frame type is not used is also included in the present invention. In such a case, all images serve as non key frames, and the embedding process is performed on all the images. In other words, it is assumed that the all the images are the non key frames, and at least ROI information may be embedded into designated positions in all the images.

In addition, the mark is embedded in order that the ROI information reading unit 408 of the image decoding device 3 specifies the embedding position of the ROI information and determines the frame type. Accordingly, even in the case where the concept of the above-described frame type is not used, the mark may be embedded in order to notify the ROI information reading unit 408 of the embedding position of the ROI information.

Alternatively, if the concept of the frame type is not used but the image encoding device 2 and the image decoding device 3 share the embedding position of ROI information by setting the embedding position to a predetermined position or the like, the mark does not have to be embedded, and it is sufficient to embed only the ROI information into the predetermined position.

[Step S104]

The pre-filtering unit 405 specifies pixels belonging to the non ROI on the basis of the ROI information, performs filtering for limiting the dynamic range on, for example, the pixels belonging to the non ROI, and outputs a pre-filtered image.

An example of the filtering for limiting the dynamic range is described in Non Patent Literature 1.

Note that, in the case where the frame type is used, such a process is performed only when the frame type is the non key frame.

[Step S105]

The encoder core unit 406 uses, for example, an image coding scheme such as H.264/MPEG-4AVC, compresses the pre-filtered image, and outputs a bitstream.

Note that, the present invention is also effective even in the case where Step S104 and Step S105 are replaced with a process using a unit that allocates a large number of bits to the ROI by using a function of controlling video qualities of respective regions. An encoder represented by JP 2009-049979A described above has such a function.

(A-2-2) Operation of Image Decoding Device

Figure 3:
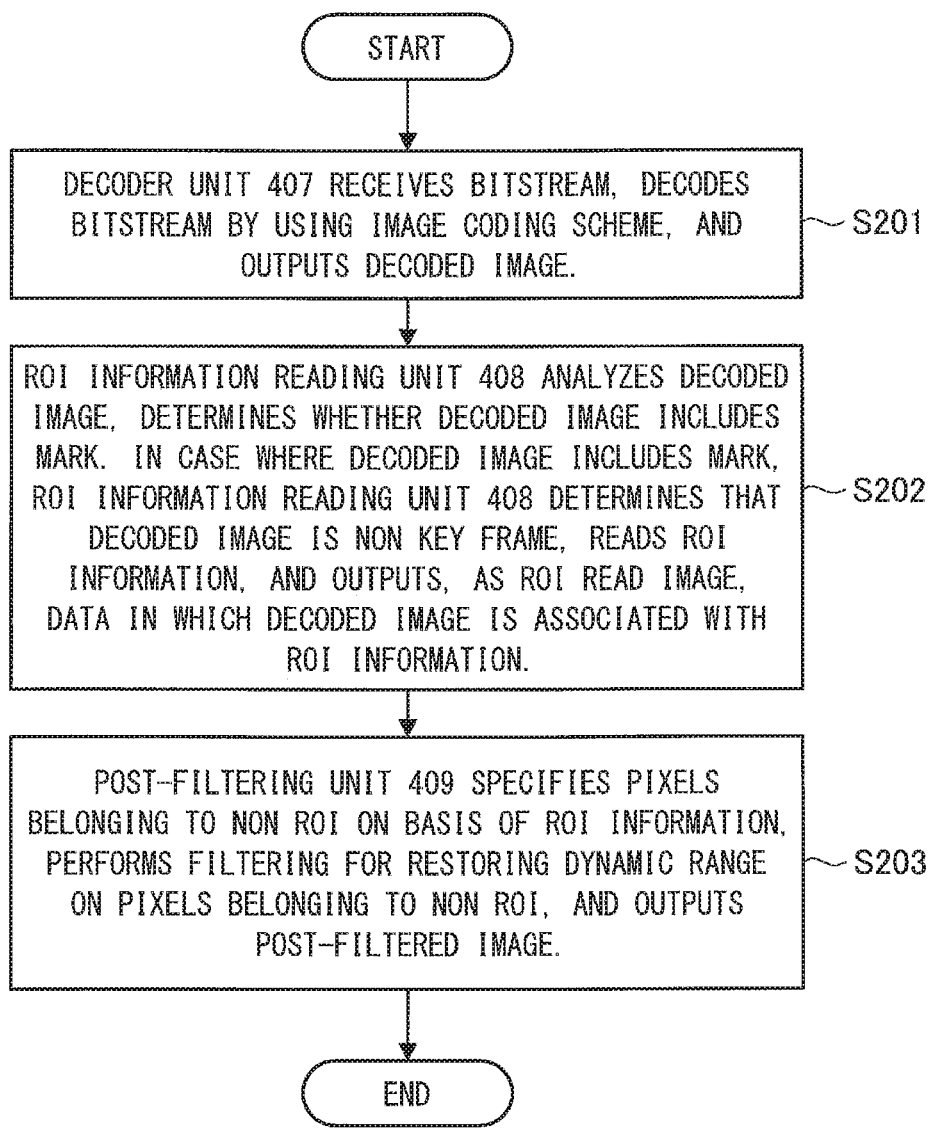
FIG. 3 is a flowchart illustrating an image process performed by an image decoding device according to the first embodiment.

Next, operation of the image decoding device 3 will be described. FIG. 3 is a flowchart illustrating an image process performed by the image decoding device 3.

[Step S201]

The decoder unit 407 receives the bitstream output from the image encoding device 2, decodes the bitstream by using, for example, an image coding scheme such as H.264/MPEG-4AVC, and outputs a decoded image.

[Step S202]

The ROI information reading unit 408 analyzes the decoded image obtained from the decoder unit 407, determines whether the decoded image includes the mark. In the case where the decoded image includes the mark, the ROI information reading unit 408 determines that the decoded image is the non key frame, reads the ROI information, and outputs, as an ROI read image, data in which the decoded image is associated with the ROI information. Details of a method of reading the ROI information embedded in the decoded image will be described later.

Note that, as described above, the case where the frame type is not used is also included in the present invention. In such a case, the frame type is not determined, but a process of reading ROI information is performed on all images.

As described above, one of the purposes of the mark is to enable the ROI information reading unit 408 to specify an embedding position of ROI information. Accordingly, the ROI information reading unit 408 may specify the embedding position of the ROI information by searching the image for the mark. Alternatively, as described above, in the case where the concept of the frame type is not used but the image encoding device 2 and the image decoding device 3 share the embedding position of the ROI information by setting the embedding position to a predetermined position or the like, the embedding position may be specified by using the predetermined position.

By using any of the above-described methods, the ROI information reading unit 408 specifies an embedding position of ROI information, analyzes the position, and reads the ROI information.

[Step S203]

The post-filtering unit 409 specifies the pixels belonging to the non ROI on the basis of the ROI information read by the ROI information reading unit 408, performs, for example, filtering for restoring the dynamic range on the pixels belonging to the non ROI, and outputs a post-filtered image.

An example of the filtering for restoring the dynamic range is described in Non Patent Literature 1, in a way similar to the pre-filtering unit 405.

Examples of the post-filtering includes a step of applying the above-described low-pass filter, a step of performing a process of achieving high resolution described in JP 2009-188792A (JP 5109697B), and various steps.

Note that, in the case where the frame type is used, such a process may be performed only when the frame type is the non key frame.

(A-2-3) Methods of Embedding and Reading Mark and ROI Information

Next, a method in which the ROI information embedding unit U2 embeds a mark or ROI information, and a method in which the ROI information reading unit 408 reads the mark or the ROI information will be described.

The ROI information embedding unit U2 embeds a mark or ROI information in a pixel value form into an intermediate image. In the case of embedding the ROI information in the pixel value form, a pixel value representing the information to be embedded is embedded into all pixel groups having sizes. Note that, the pixel groups are regions that do not overlap each other. For example, each of the pixel groups is a region having a rectangular shape or the like. This makes it possible to prevent deterioration of the embedded value caused by deterioration due to an encoding process in a subsequent stage.

However, a configuration in which a pixel group consists of one pixel is also included in examples of operation according to the present invention, although this cannot achieve the effect of preventing deterioration caused by the encoding process.

It is assumed that, in response to embedding of the mark or the ROI information, the information to be embedded is read on the basis of a statistical value of pixel values of one or more pixels included in the pixel group when the information is read through image analysis. Details of the statistical value will be described later.

[Embedding Position of Mark or ROI Information]

Figure 4:
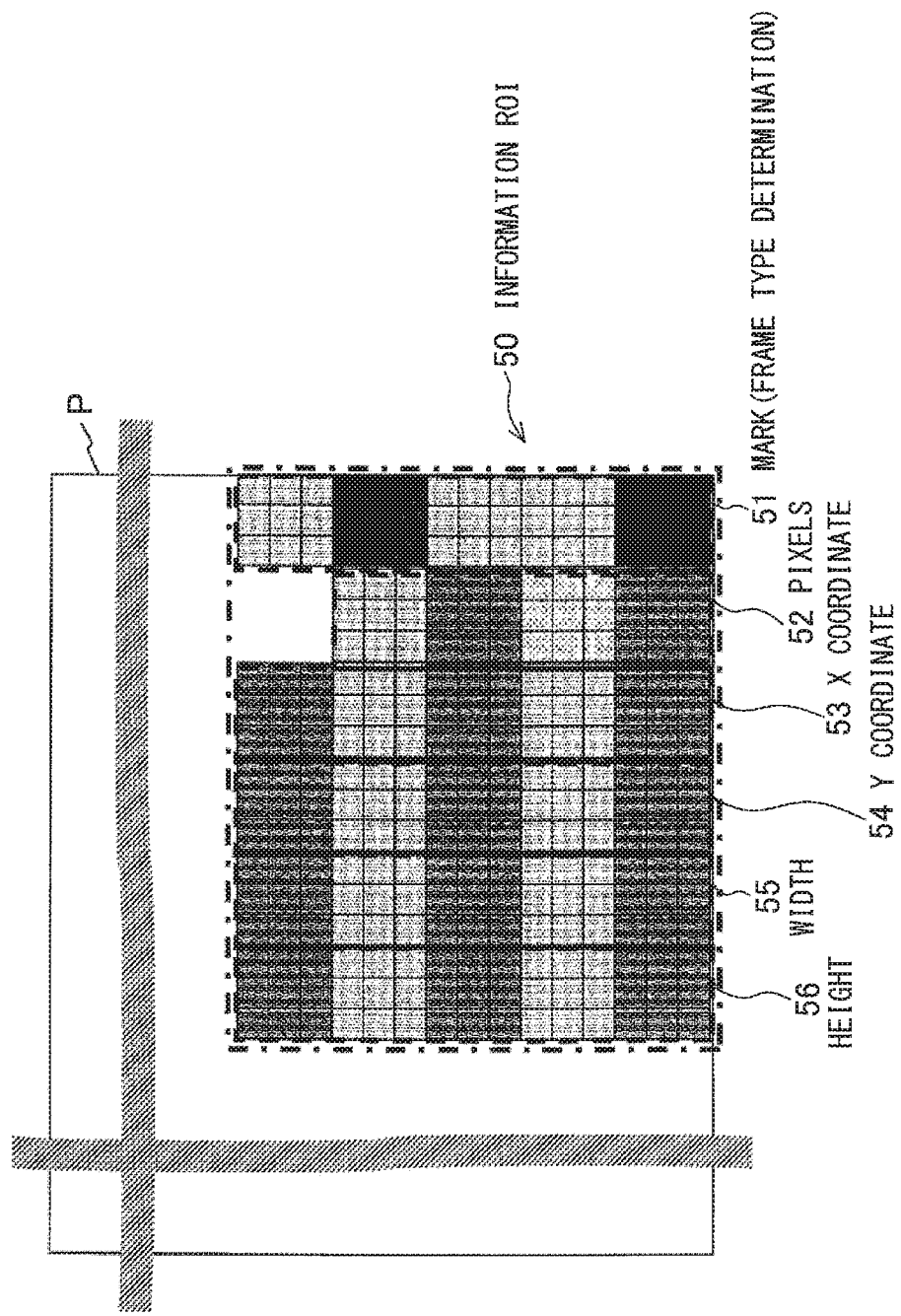
FIG. 4 is an explanatory diagram for describing a method of embedding ROI information according to the first embodiment.

FIG. 4 is an explanatory diagram for describing a method of embedding ROI information according to the first embodiment.

In FIG. 4, a reference sign "P" represents a whole image. In this example, a starting point of an embedding position is set to a position in a lower right corner of the image P, and a mark and ROI information are embedded sequentially from the starting point in the left direction.

For example, in FIG. 4, a reference sign "50" represents a region (hereinafter, also referred to as an "information ROI") including the mark and the ROI information. A reference sign "51" represents a region (a pixel group) into which a mark for determining a frame type is embedded, for example. A reference sign "52" represents pixels. A reference sign "53" represents a pixel group into which an ROI number is embedded. A reference sign "54" represents a region (a pixel group) into which a value of an X coordinate of the ROI information is embedded. A reference sign "55" represents a region (a pixel group) into which a value of a Y coordinate of the ROI information is embedded. A reference sign "56" represents a region (a pixel group) into which a value representing a width regarding the size of the ROI information. A reference sign "57" represents a region (a pixel group) into which a value representing a height (a vertical length) regarding the size of the ROI information.

The maximum theoretical amount of data to be embedded into one pixel group is the number of bits of a pixel value. Therefore, for example, in the case where the pixel value is represented by using 8 bits, the maximum theoretical amount of data to be embedded is 8 bits. In addition, in practice, an amount of data to be embedded is less than 8 bits in order to prevent deterioration of the ROI information caused by deterioration occurred during an encoding process in a subsequent stage.

In the case where pieces of data constituting the ROI information are each larger than the maximum amount of data capable of being embedded into one pixel group, a piece of the data is divided and embedded into two or more pixel groups. In the example illustrated in FIG. 4, one or more pixel groups disposed toward an upper direction in FIG. 4 are prepared, and respective pieces of the data are embedded therein.

The same applies to the mark. Any mark can be used as long as the mark is a pattern that is uniquely specified by the ROI information reading unit 408, and there is a low possibility that the pattern is unintentionally generated in the image. In the example illustrated in FIG. 4, each of the pixel groups consists of a fixed pattern in a dark color or a light color. Even in the case where the plurality of pixel groups are used for forming the pattern like this example, one or more pixel groups disposed toward the upper direction are prepared.

In addition, in the case where the embedding is performed in the lower right coder of the image in the example illustrated in FIG. 4, it is assumed that various kinds of data and the mark are embedded sequentially from the lower right corner of the image, which is the starting point, toward the left direction, and one or more pixel groups, into which a piece of data will be embedded toward the upper direction, are ensured. However, there are various possible alternatives regarding which direction data is embedded toward from coordinates of a starting point designated in accordance with an embedding position. As exemplified in FIG. 4, the image processing system 1 may preliminarily decide toward which direction data is embedded in accordance with an embedding position. Alternatively, for example, two or more types of mark patterns may be prepared, and embedding directions depending on the respective mark patterns may be shared in the image processing system 1.

In addition, in the example illustrated in FIG. 4, The ROI number and various coordinate values are embedded as independent pieces of data. However, it is also possible to use a character string format such as JSON, convert the ROI information into a single integrated piece of data, and embed the character string toward a shared direction.

[Statistical Value]

Figure 5:
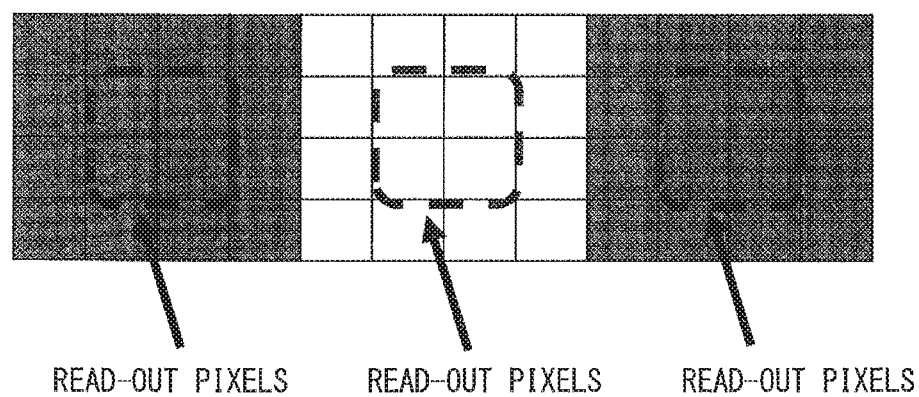
FIG. 5 is an explanatory diagram for describing an example of a statistical value according to the first embodiment.

Examples of the above-described statistical value include an average value of pixel values of pixels constituting an image group, a median of the pixel values of the pixels constituting the image group, a statistical value (an average value or a median) of one or more pixels located in the center among the pixels constituting the image group as illustrated in FIG. 5, and the like.

As described above, it is assumed that the embedded pixel values deteriorate due to deterioration caused by an encoding process. However, when reading is performed by using the statistical value, it is possible to reduce a possibility that the deterioration damages the ROI information.

Especially, when a statistical value of one or more pixels located in the center is used as the statistical value, it is possible to perform reading with robustness against the deterioration.

This is because, during an image compression process, an effect of transform quantization or an in-loop filter such as a deblocking filter for enhancing quality of a decoded image generally brings about a filtering effects that causes a pixel value of a certain pixel to affect pixel values of ambient pixels. This filter effect is one of causes of damaging ROI information represented in a pixel value form. However, the above-described pixel group has a same pixel value. Therefore, although pixels located near the edge of the pixel group are affected by their ambient pixels and are changed, pixels located in the center of the pixel group are protected by the pixels located near the edge and are less affected because the filter effect is brought about among neighboring pixels.

[Embedding of ROI Information in Pixel Value Form]

Next, as regards embedding and reading of ROI information in a pixel value form, what kind of pixel value is generated by the RIO information embedding unit U2 and how the ROI information reading unit reads the generated pixel value will be described.

Various kinds of methods are considered with regard to what kind of pixel values is generated and how to read the generated pixel value. Examples thereof will be described below.

Method Example 1

In the case where the number of bits of a pixel value is an integer value N, embedded information is X, and the number of bits of X is an integer value n that is less than or equal to N, a pixel value representing the embedded information is obtained by inputting X into upper n bits among the N bits, inputting "1" into an (n+1)-th bit from the most significant bit, and inputting "0" into the other bits.

In this case, it is possible to read the embedded information X by extracting n bits from the most significant bit of the pixel value or the statistical value of the pixel group as described above.

By inputting "1" into the (n+1)-th bit from the most significant bit, it is possible to reduce a possibility that the ROI information is damaged by the above-described filter effect.

Specifically, the ROI information is not damaged unless noise larger than $2^{(N-n-1)}$ is subtracted from the pixel value, or unless noise larger than or equal to $2^{(N-n-1)}$ is added to the pixel value.

For example, in the case where N=8, n=3, and a bit string to be embedded is xxx, a pixel value representing embedded information is 8-bit data, which is xxx10000.

In this case, if noise larger than 10000 is subtracted or noise larger than or equal to 10000 is added, xxx is damaged. In the other cases, xxx is saved without any damage.

Note that, in the case where n=1, which is a special case regarding the method example 1, it is possible to read the information X by performing comparison operation between the pixel value or the above-described statistical value of the pixel group and a predetermined number (such as 0111111 or 10000000).

For example, in the case where a result of the comparison operation is more than or equal to a predetermined numerical value, it is determined that X=1. In the case where the result of the comparison operation is smaller than the predetermined numerical value, it is determined that X=0. In this case, it is possible to transmit ROI information without any damage even when the pre-filtering unit 405 limits a dynamic range to around 0111111 or 10000000 by using a filer for limiting the dynamic range proposed in Non Patent Literature 1. In addition, it is possible to read the ROI information without using a process of restoring the dynamic range.

Method Example 2

In the case where the number of bits of a pixel value is an integer value N, embedded information is X, and the number of bits of X is an integer value n that is less than or equal to N, a pixel value representing the embedded information is obtained by inputting "X" into lower n bits of Y, and leaving upper (N-n) bits of Y unchanged, where "Y" is a pixel value of embedding target pixels in an intermediate image.

In this case, it is possible to read the embedded information X by extracting n bits from the least significant bit of the pixel value or the statistical value of the pixel group as described above.

For example, in the case where N=8, n=3, a bit string to be embedded is xxx, and a bit string of the pixel value of the embedding target pixels in the intermediate image is yyyyyyyy, a pixel value representing the embedded information is 8-bit data, which is yyyyyxxx.

According to the method example 2, the ROI information is embedded into the lower bits. Therefore, the method example 2 is disadvantageous in that the method example 2 is affected by coding distortion, the above-described filter effect, or the like more easily than the method example 1. However, the method example 2 is advantageous in that it is difficult to recognize the ROI information by the human eye because the upper bits are a value of the pixel value of the original image.

Method Example 3

In the case where the number of bits of a pixel value is an integer value N, embedded information is X, and the number of bits of X is an integer value n that is less than or equal to N, a pixel value representing the embedded information is obtained by inputting "X" into upper n bits among lower (n+m) bits of Y, leaving upper (N−(n+m)) bits of Y unchanged, inputting 1 into the most significant bit among lower m bits, and inputting 0 into the other bits among the lower m bits, where "Y" is a pixel value of embedding target pixels in an intermediate image, and m is a predetermined integer value.

In this case, it is possible to read the embedded information X by extracting the upper n bits from the lower (n+m) bits among the pixel value or the statistical value of the pixel group as described above.

For example, in the case where N=8, n=3, m=2, a bit string to be embedded is xxx, and a bit string of the pixel value of the embedding target pixels in the intermediate image is yyyyyyyy, a pixel value representing the embedded information is 8-bit data, which is yyyxxx10.

The method example 3 is a method obtained by combining the method example 1 and the method example 2. According to the method example 3, X is embedded into intermediate bits among N bits constituting a pixel value. Therefore, characteristics of the method example 3 are similar to the method example 1 and the method example 2. The method example 3 provides greater robustness against pixel value deterioration than the method example 2, and forms an image that is more meaningful for human eye than the method example 1.

There are various alternatives such as a method of converting information into a frequency space and embedding it in a frequency space. However, this is the same as the above-described examples in embedding information into a pixel value. Therefore, the above-described method examples are representatives of various method examples including the various alternatives.

[Embedding Position]

Last of all, reasons why the optimal embedding position of ROI information is the lower right corner and the second optimal embedding position is the lower left corner or the upper right corner, will be described.

Figure 6:
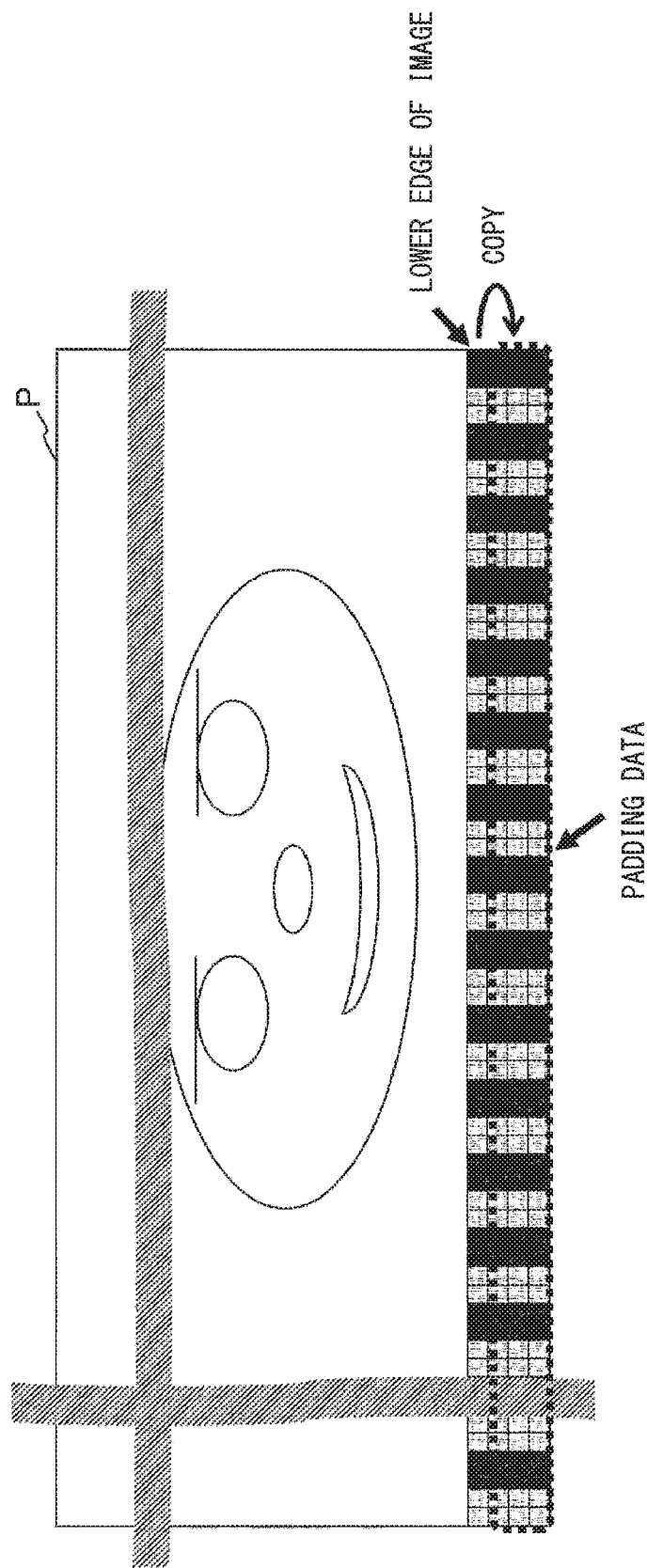
FIG. 6 is an explanatory diagram illustrating an example of embedding padding data according to the first embodiment.

In the case where the encoder unit U3 in the subsequent stage compresses an image in accordance with, for example, H.264/MPEG-4 AVC or a similar scheme, such a scheme limits the size of the input image to a multiple of a predetermined number, such as a multiple of 16. Therefore, in the case where an image of a size that is not a multiple of the predetermined number is input, padding data is added to a lower edge or a right edge of the image to obtain a size that is the multiple of the predetermined number. The padding data is data that is essentially meaningless. Therefore, it is not desirable to use a large code amount for the padding data. In general, the amount of data gets smaller as differences between pixels are reduced when encoding an image. Therefore, in many cases, padding data is a copy of a nearest pixel value like an example illustrated in FIG. 6. In the example illustrated in FIG. 6, 3 copies of each of pixel values lined on a lower edge of an image P are made downwardly. In other words, the 3 copies corresponding to 3 pixels are added at the lower edge of the image as the padding data.

Here, if some information is embedded into the lower right corner of the image and the size of the input image is not a multiple of a predetermined number, a pixel value of a pixel into which the information is embedded is copied as padding data. In the case where the pixel value of the pixel into which the information is embedded is copied as the padding data, the number of the same pixels as the pixel into which the information is embedded increases around the pixel into which the information is embedded. This makes it possible to reduce risk of damaging the embedded information due to the above-described filter effect.

Note that, it is also possible for the ROI information embedding unit U2 to enlarge the size of the image in advance and prepare an embedding region of a predetermined size in the image. This region does not include image information that is meaningful for viewers. For example, any pixel value such as 128 is embedded into this region. For example, an embedding region is prepared by adding certain number of pixels having a pixel value of 128 to the bottom of the image. In addition, it is possible for the embedding position designation unit 102 to designate this region as an embedding position.

(A-3) Effect According to First Embodiment

As described above, according to the first embodiment, the ROI information embedding unit U2 embeds ROI information into an image, and the ROI information reading unit 408 extracts information from embedding target pixels through image analysis and reads the ROI information. This makes it possible to input the ROI information and the image to the post-filtering unit 409. The ROI information and the image are mutually synchronized without synchronization through buffering. As a result, it is possible for the image decoding device to read the ROI information of the image as long as the image decoding device receives the image. Therefore, it is possible to prevent a problem in which data of any one of the image and the ROI information is lost and it becomes impossible to match the image and the ROI information in their correspondence relation.

(B) Second Embodiment

Next, a second embodiment of the encoding device, the decoding device, the image processing system, and the image processing method according to the present invention will be described with reference to drawings.

(B-1) Configuration According to Second Embodiment

Figure 7:
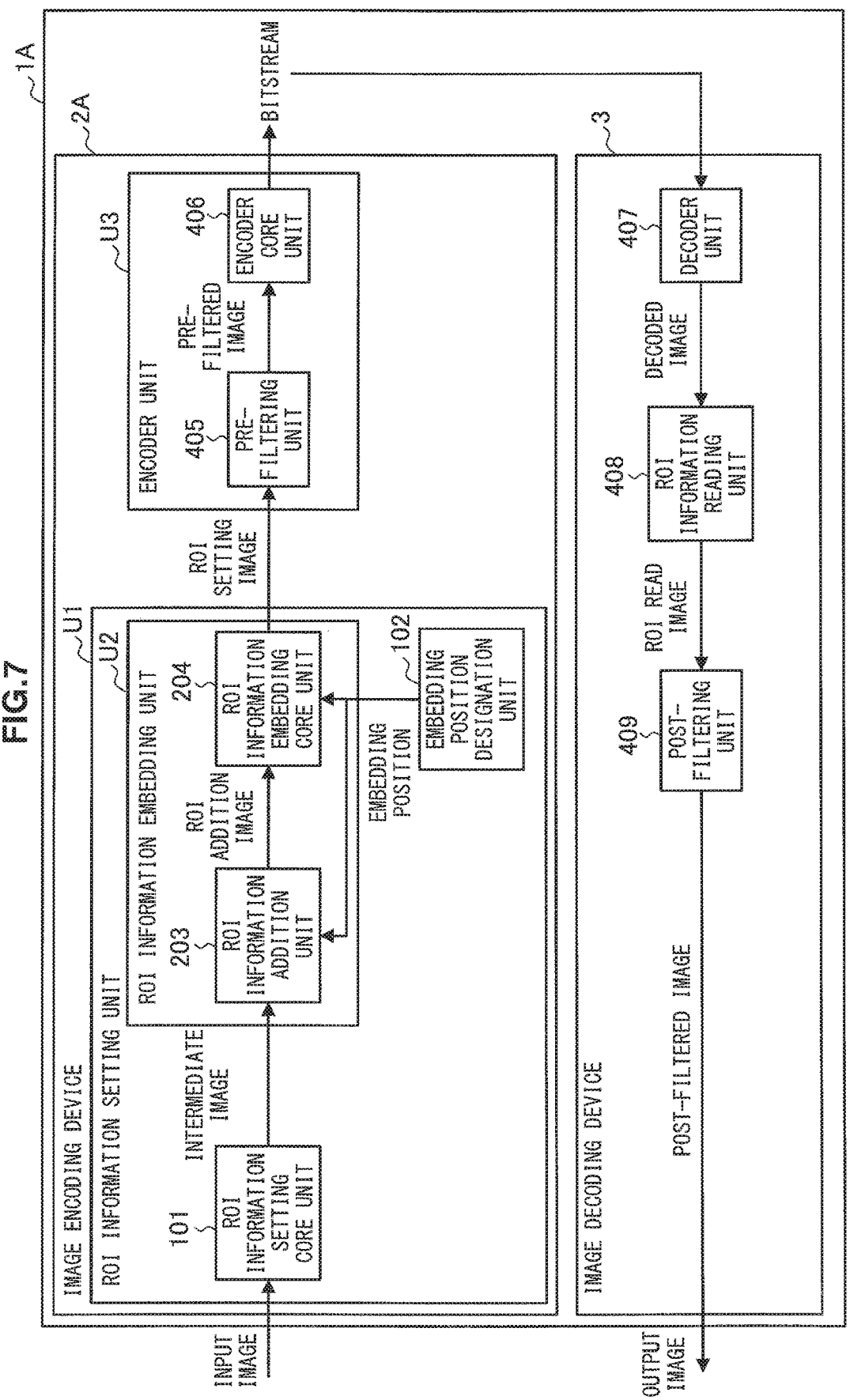
FIG. 7 is a configuration diagram illustrating a configuration of an image processing system according to a second embodiment.

FIG. 7 is a configuration diagram illustrating a configuration of the image processing system according to the second embodiment.

A configuration of an image encoding device 2A according to the second embodiment illustrated in FIG. 7 is different from the configuration of the image encoding device 2 according to the first embodiment illustrated in FIG. 1. Therefore, a structural element different from the image encoding device 2 illustrated in FIG. 1 will be mainly described below.

With reference to FIG. 7, an ROI information encoding unit U2 of the image encoding device 2A according to the second embodiment includes an ROI information addition unit 203 and an ROI information embedding core unit (also referred to as an "ROI information embedding execution unit") 204.

The ROI information addition unit 203 acquires an embedding position of ROI information from the embedding position designation unit 102, and finds a region including all pixels into which the ROI information embedding core unit 204 embeds the ROI information, on the basis of the embedding position. In addition, the ROI information addition unit 203 adds the region to the ROI information as an information ROI, and outputs, as an ROI addition image, data in which an intermediate image is associated with the ROI information.

Basically, the ROI information embedding core unit 204 functions in the same way as the ROI information embedding unit U2 according to the first embodiment, and embeds a mark or ROI information in a pixel value form into the intermediate image. Here, in a process of embedding the ROI information in the pixel value form, the ROI information in the pixel value form is embedded into the ROI addition image obtained from the ROI information addition unit 203, and then data associated with the ROI information is output to the encoder unit U3 as an ROI setting image.

(B-2) Operation According to Second Embodiment

Next, operation of an image processing method performed by an image processing system 1A according to the second embodiment will be described with reference to FIG. 8. Hereinafter, operation performed by the image encoding device 2A according to the second embodiment will be mainly described.

[Step S101 and Step S102]

Figure 8:
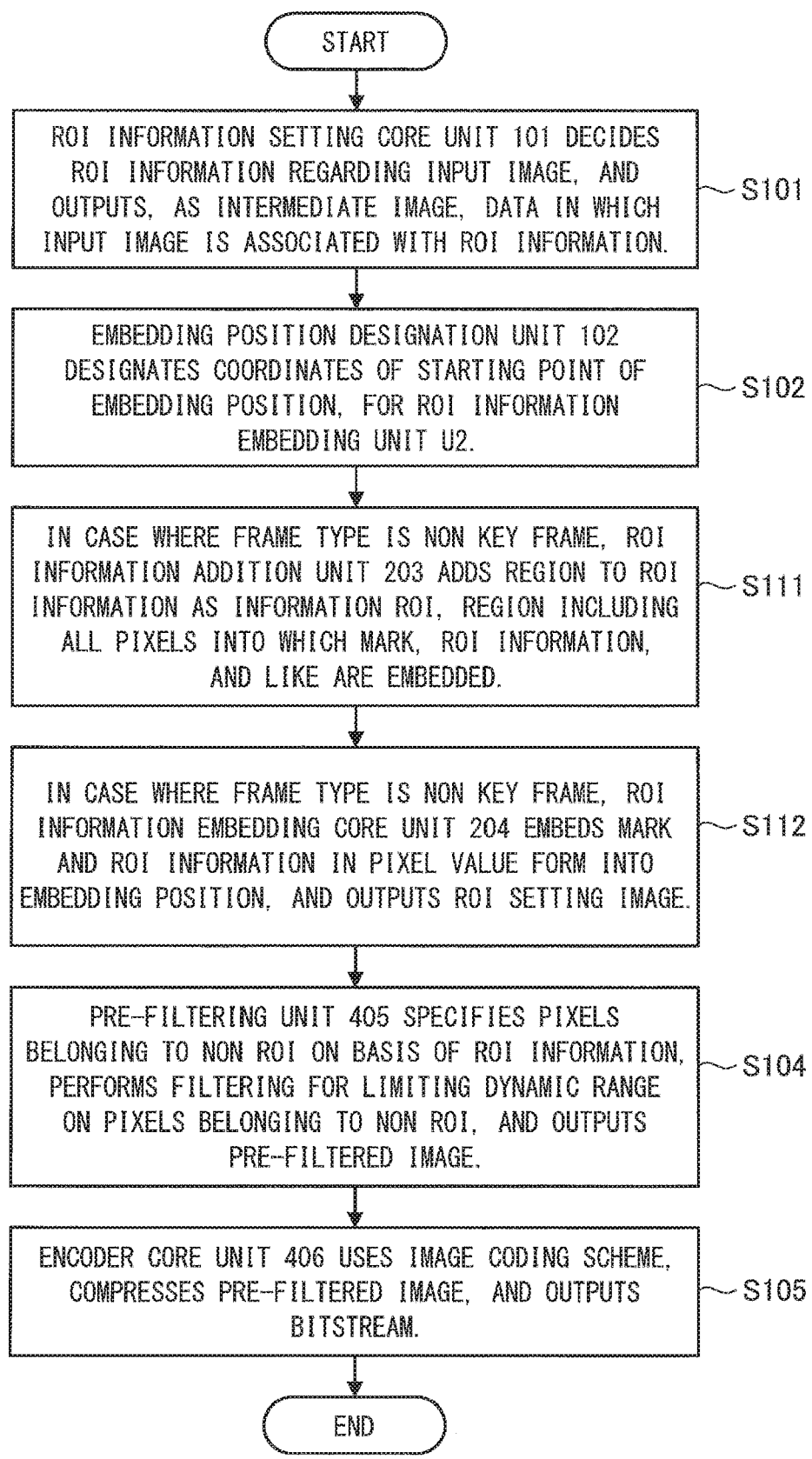
FIG. 8 is a flowchart illustrating operation of an image process performed by the image processing system according to the second embodiment.

As illustrated in FIG. 8, in a way similar to the first embodiment, the ROI information setting core unit 101 decides ROI information of an input image, and outputs, as an intermediate image, data in which the input image is associated with the ROI information. The embedding position designation unit 102 designates coordinates of a starting point of an embedding position, for the ROI information addition unit 203 and the ROI information embedding core unit 204 of the ROI information embedding unit U2.

[Step S111]

In the case where a frame type is the non key frame, the ROI information addition unit 203 adds a region to the ROI information as an information ROI. The region includes all pixels into which a mark, the ROI information, and the like are embedded.

The region including all the pixels into which the ROI information is embedded varies depending on an amount of data of the ROI information, an embedding method, and the like. For example, FIG. 4 illustrates the example of an including region if the amount of data of the ROI information, the embedding method, and the like are supposed. As illustrated in FIG. 4, the information ROI 50 is, for example, a rectangular region of the minimum size including all of the mark 51, the pixels 52, the ROI number 53, the X coordinate 54, the Y coordinate 55, the width 56, and the height 57.

Here, in the case where the frame type is the key frame, the ROI information addition unit 203 may add the information ROI to the ROI information, but does not have to add the information ROI to the ROI information. In any case, the present invention is effective. In this case, the information ROI may be added to the ROI information with regard to all images.

[Step S112]

In the case where the frame type is the non key frame, the ROI information embedding core unit 204 embeds the mark and the ROI information in a pixel value form into the embedding position, and outputs an ROI setting image.

Note that, as described above, the case where the frame type is not used is also included in the present invention. In such a case, the embedding process may be performed on all the images as described in Step S103 according to the first embodiment.

[Step S104 and Step S105]

In a way similar to the first embodiment, the pre-filtering unit 405 specifies pixels belonging to the non ROI on the basis of the ROI information, performs filtering for limiting the dynamic range on, for example, the pixels belonging to the non ROI, and outputs a pre-filtered image. In addition, the encoder core unit 406 uses, for example, an image coding scheme such as H.264/MPEG-4AVC, compresses the pre-filtered image, and outputs a bitstream.

Note that, in this embodiment, when lossless compression is performed with regard to the ROI, it is possible for the encoder unit U3 to transmit the image without deterioration in the ROI information embedded in the pixel value form. This makes it possible to certainly obtain the effects of the present invention.

In particular, in the case where the method example 2 or the method example 3 is used as the method related to what kind of pixel values is generated and how to read the generated pixel value, which has been described in the paragraphs related to the operation according to the first embodiment, it is possible to avoid damage in the ROI information by performing the lossless compression with regard to ROI. Such a configuration is useful.

(B-3) Effect According to Second Embodiment

As described above, according to the second embodiment, it is possible to prevent deterioration in pixel values by setting an ROI to pixels into which ROI information is embedded. This makes it possible to prevent breaking down of the ROI information and prevent triggering of abnormal operation, and this makes it possible to certainly synchronize the ROI information with the image.

In particular, in the case where a large number of bits are allocated to the ROI by using the function of controlling video qualities of respective regions, which is included in an encoder represented by JP 2009-049979A, or in the case of the system in which the pre-filtering unit 405 limits a dynamic range to perform ROI coding, information embedded in a pixel value form is expected to significantly deteriorate due to coding distortion and the limitation of the dynamic range. Therefore, the above-described effects are important.

(C) Third Embodiment

Next, a third embodiment of the encoding device, the decoding device, the image processing system, and the image processing method according to the present invention will be described with reference to drawings.

(C-1) Configuration According to Third Embodiment

Figure 9:
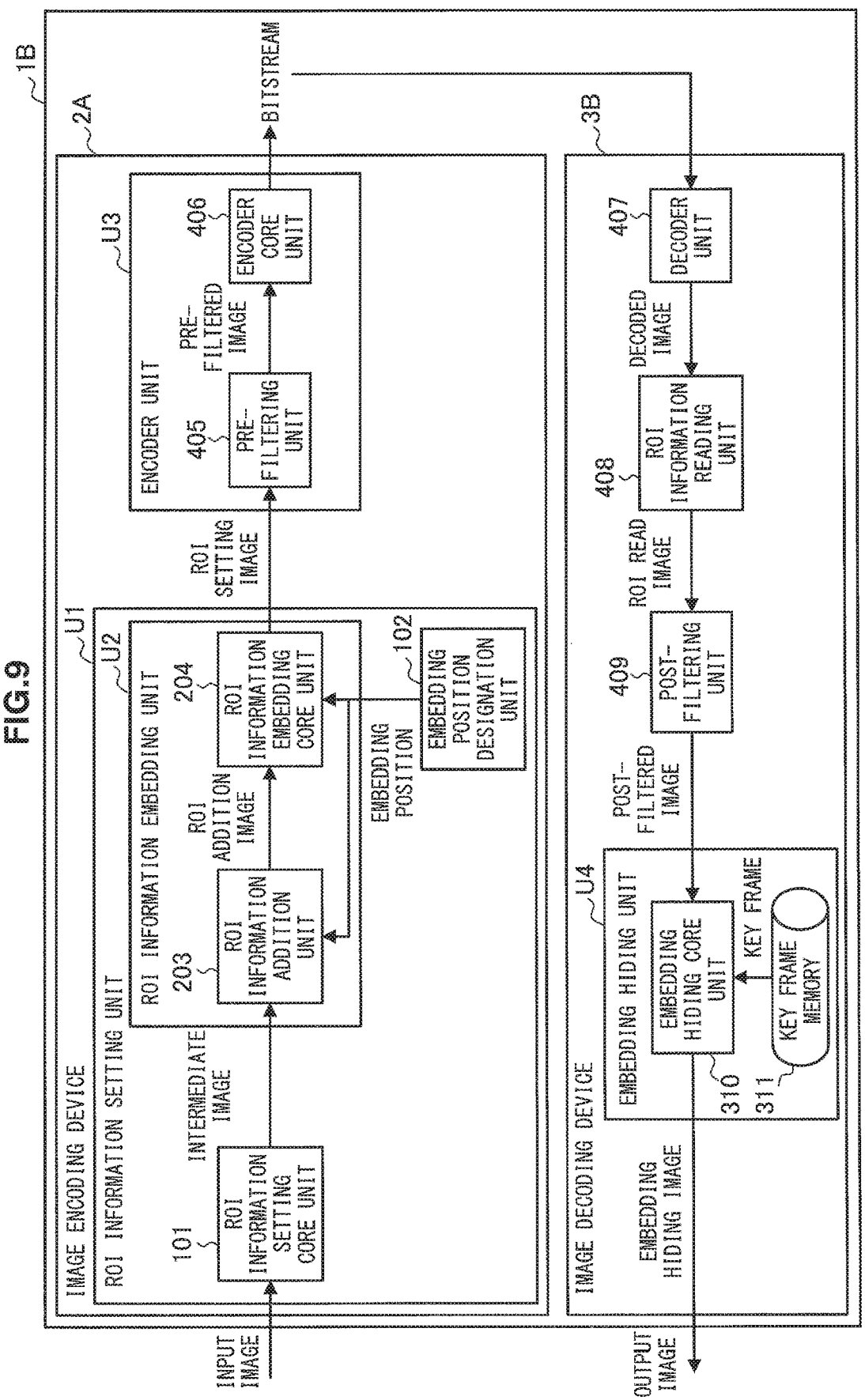
FIG. 9 is a configuration diagram illustrating a configuration of an image processing system according to a third embodiment.

FIG. 9 is a configuration diagram illustrating a configuration of the image processing system according to the third embodiment.

A configuration of an image decoding device 3B according to the third embodiment illustrated in FIG. 9 is different from the configuration of the image decoding device 3 according to the first and second embodiments. Therefore, a structural element different from the structural elements of the image decoding device 3 according to the first and second embodiments will be mainly described below.

Note that, FIG. 9 illustrates a case where the image encoding device 2A is the same as the image encoding device according to the second embodiment illustrated in FIG. 7. However, the third embodiment is also applicable to a case where the image encoding device according to the first embodiment illustrated in FIG. 1 is used, and this also achieves the effects of the present invention.

In a way similar to the first and second embodiments, the image decoding device 3B includes the decoder unit 407, the ROI information reading unit 408, and the post-filtering unit 409. In addition, the image decoding device 3B includes an embedding hiding unit U4.

The embedding hiding unit U4 performs a process of hiding a region from a screen, and output an embedding hiding image. The region is a region into which ROI information in the pixel value form is embedded in the post-filtered image obtained from the post-filtering unit 409. The embedding hiding image is output from the embedding hiding unit U4 as an output image.

The embedding hiding unit U4 includes, for example, key frame memory 311 and an embedding hiding core unit (also referred to as an "embedding hiding execution unit") 310. The key frame memory 311 stores key frames. The embedding hiding core unit 310 performs a hiding process by using a key frame stored in the key frame memory 311.

(C-2) Operation According to Third Embodiment

Next, operation of an image processing method performed by an image processing system 1B according to the third embodiment will be described with reference to FIG. 10. Hereinafter, operation performed by the image decoding device 3B according to the third embodiment will be mainly described.

[Step S201 to Step S203]

Figure 10:
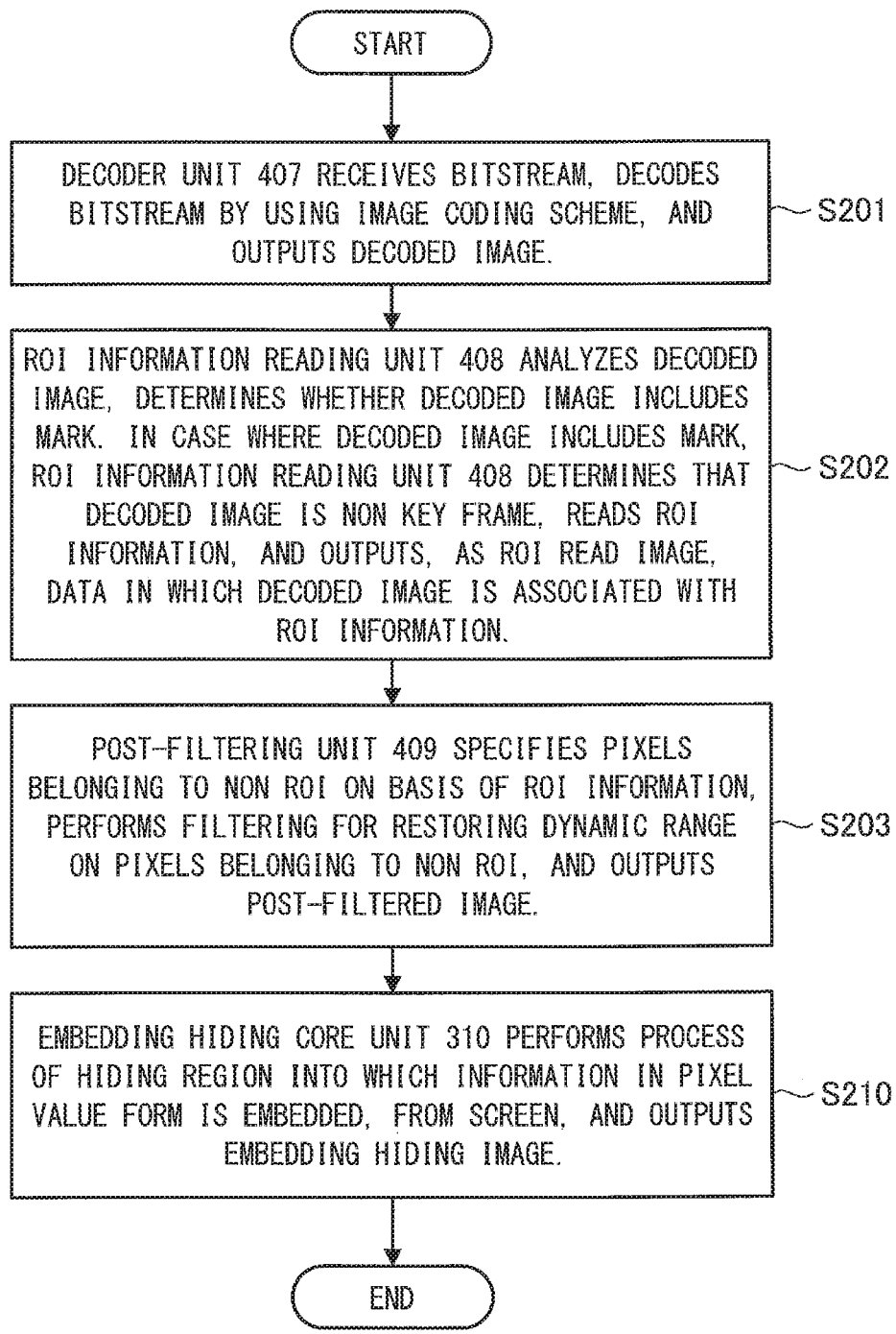
FIG. 10 is a flowchart illustrating operation of an image process performed by the image processing system according to the third embodiment.

As illustrated in FIG. 10, the decoder unit 407 performs decoding by using, for example, the image coding scheme such as H.264/MPEG-4AVC, and outputs a decoded image.

The ROI information reading unit 408 analyzes the decoded image obtained from the decoder unit 407, determines whether the decoded image includes a mark. In the case where the decoded image includes the mark, the ROI information reading unit 408 determines that the decoded image is the non key frame, reads ROI information, and outputs, as an ROI read image, data in which the decoded image is associated with the ROI information.

The post-filtering unit 409 specifies pixels belonging to the non ROI on the basis of the ROI information read by the ROI information reading unit 408, performs, for example, filtering for restoring the dynamic range on the pixels belonging to the non ROI, and outputs a post-filtered image.

[Step S210]

The embedding hiding core unit 310 performs a process of hiding a region from a screen, and outputs an embedding hiding image. The region is a region into which information in a pixel value form is embedded.

[Hiding Process]

Figure 11:
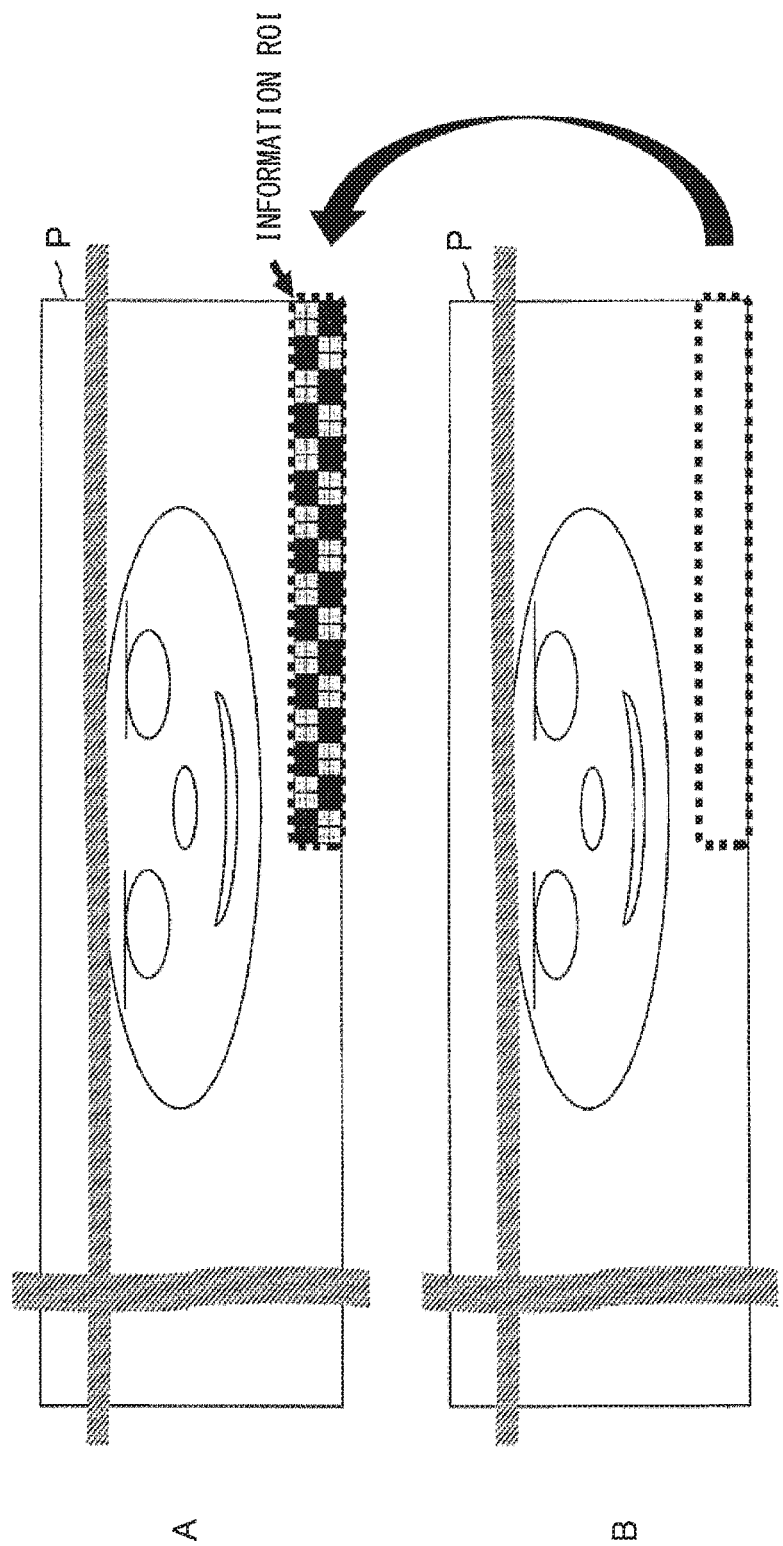
FIG. 11 is an explanatory diagram for describing an example of an embedding hiding process (part 1) according to the third embodiment.

In the case where the concept of the frame type is used, for example, in the case where the frame type is the key frame as illustrated in FIG. 11, the key frame memory 311 stores a copy of an image in the hiding process. In the case where the frame type is the non key frame, a pixel value corresponding to the key frame is copied to a pixel value of an information ROI. This makes it possible to hide the information ROI and output an embedding hiding image.

Note that, when performing such a process, the post-filtering unit 409 outputs the ROI information found by using the ROI read image, also in association with the post-filtered image.

Note that, any key frame is effective for hiding as long as an image is similar to the non key frame. For example, there are a method of using a key frame that is temporally close to a non key frame to be hidden, and a method of using a most recently acquired key frame among key frames acquired before the non key frame to be hidden.

Note that, as described in the first embodiment, in the case where the concept of the frame type is used, the mark and the ROI information are not embedded in a key frame according to the present invention, and the frame type is determined on the basis of whether or not the mark is included. This makes it possible for the embedding hiding unit U4 to achieve the above-described effects.

Figure 12:
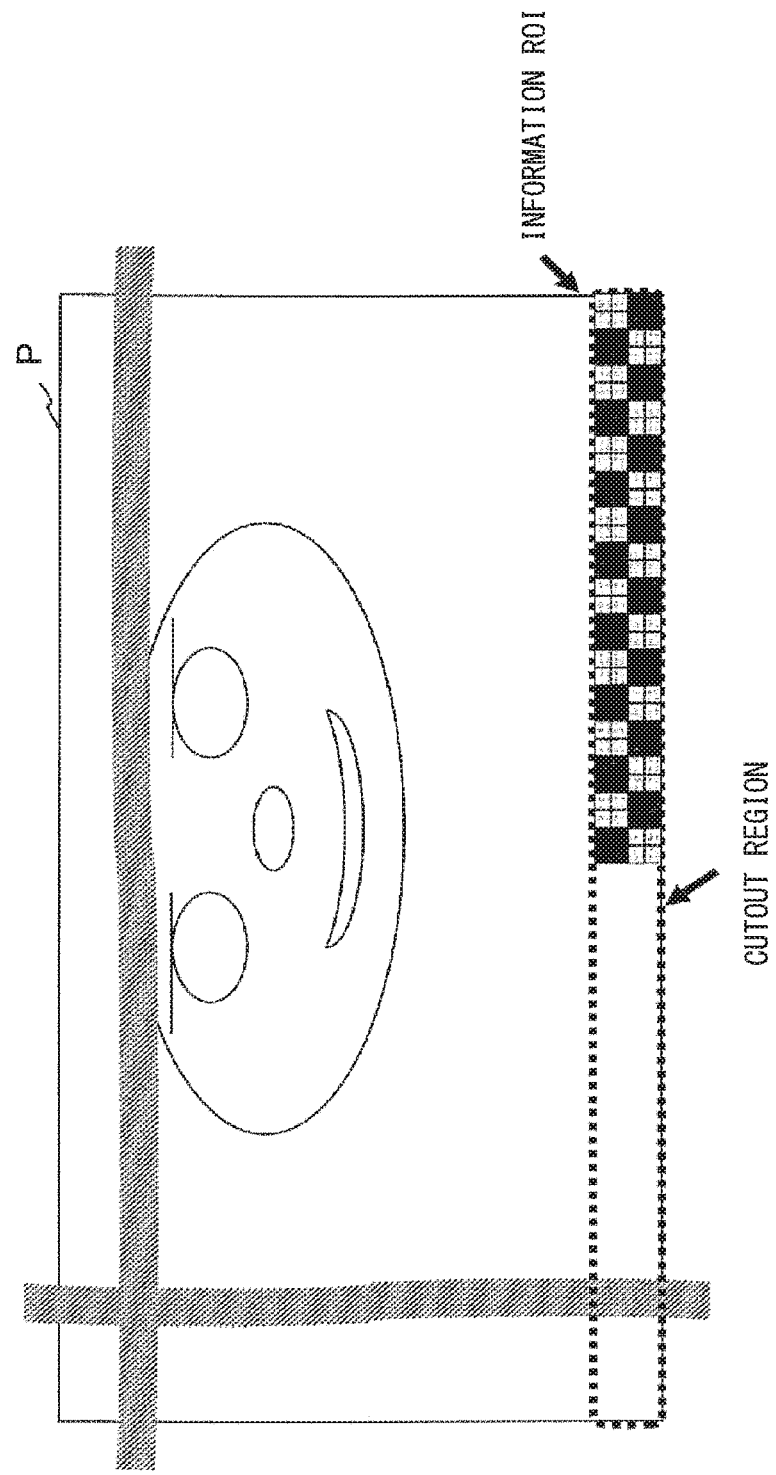
FIG. 12 is an explanatory diagram for describing the example of the embedding hiding process (part 2) according to the third embodiment.
Figure 13:
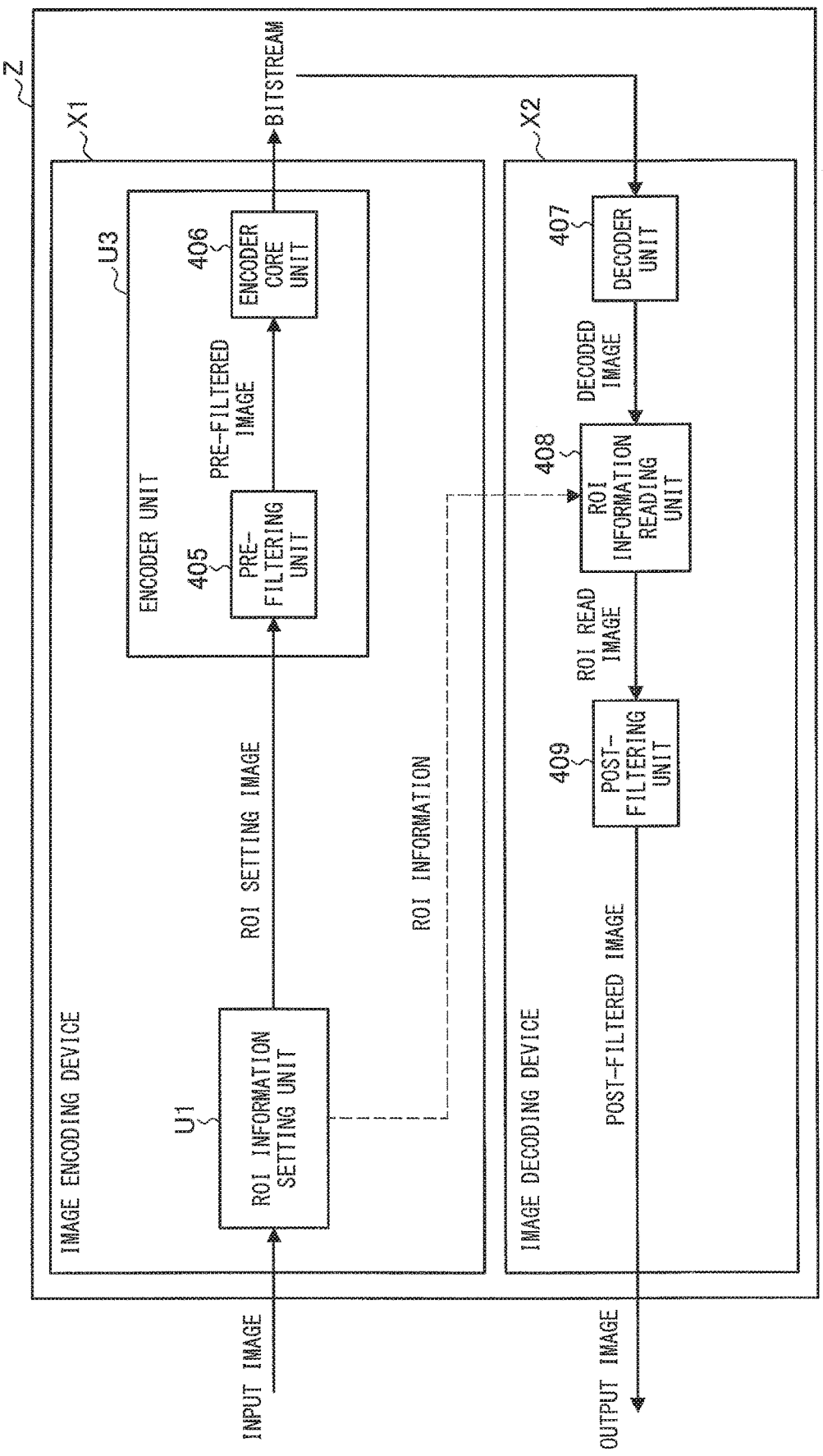
FIG. 13 is a configuration diagram illustrating a configuration of a conventional image processing system.

In addition, for example, as illustrated in FIG. 12, the hiding process may be a process of generating an embedding hiding image by performing a process of cutting out a region in a post-filtered image from a screen. In this region, information in a pixel value form is embedded.

The region to be cut out may be transmitted as a piece of ROI information. In particular, in the case where the ROI information embedding unit U2 enlarges the size of an image and prepares an embedding region of a predetermined size in the image as described in the first embodiment, and the embedding position designation unit 102 designates this region as an embedding position, it is possible to hide this region from viewers by performing the above-described cutout process.

(C-3) Effect According to Third Embodiment

As described above, the third embodiment further includes the embedding hiding unit U4 that hides an embedded pixel value. This makes it possible to prevent display of the pixel value that is not necessary for the viewers in a normal situation, and this makes it possible to improve viewing quality.

(D) Other Embodiments

The diverse modifications have been described in the above-described first to third embodiments. In addition, the present invention is also applicable to modifications as follows.

(D-1) In the case where the types of data that may serve as ROI information are limited in a system operating environment, it is possible to use a table to manage real data indicating regions in association with indices in the image processing system, and it is possible for the ROI information embedding unit U2 to embed an index in a pixel value form into an intermediate image as the ROI information. In this case, the ROI information reading unit 408 reads the index by analyzing a decoded image, and specifies a region of interest by using the index and the table.

Such operation makes it possible to reduce the amount of data of the ROI information, and achieve an effect of suppressing image deterioration caused by embedding.

(D-2) In all the embodiments described above, the whole image is classified into two types of regions, which are the ROI and the non ROI, for ease of explanation of the present invention. In addition, the non ROI may be classified into levels of importance. For example, when a pedestrian detection algorithm and a face detection algorithm are used for setting an ROI, an ROI detected through the face detection algorithm may be used as a face region, a pedestrian region detected through the pedestrian detection algorithm may be used as a non ROI that is relatively important, and a region that does not include a face or a pedestrian may be used as a non ROI that is not relatively important. In this case, to reduce an amount of data of non ROI information, for example, it is possible to compress the regions into different dynamic ranges depending on levels of importance of non ROIs. For example, the non ROI that is relatively important may be compressed by using a wide dynamic range, and the non ROI that is not relatively important may be compressed by using a narrow dynamic range. It is possible to decide which non ROIs are compressed by using which dynamic ranges, on the basis of a lookup table that is set or created in advance. The lookup table includes the levels of importance of the non ROIs and levels of intensity of filters. In addition, in a similar way, the example in which filtering is not performed on the ROI has been described in this specification for ease of explanation. However, it is possible to perform weaker filtering on the ROI than the non ROIs.

(D-3) In all the embodiments described above, an amount of data is reduced by deteriorating a non ROI, for example, in the case where a face region is used as an ROI. However, it is also possible to deteriorate a region selected as the ROI, such as the face region. In this case, the wording "non face region" is defined as an ROI, and wording "face region" is defined as a non ROI, on the basis of the definitions made in this specification. When the non face region is the ROI, it is also possible to achieve an effect of protecting privacy, for example (D-4) In all the embodiments described above, data is exchanged between the functional blocks in units of images. However this is just for clarifying the meaning of data of pixel value signals. In practice, it is also possible to exchange data in units of pixels.

(D-5) In all the embodiments described above, the ROI is mainly a limited region that is a part of an image space. However, it is also possible to use an image consisting only of an ROI, or an image consisting only of a non ROI.

(D-6) In all the embodiments described above, the functions of the image encoding system X1 and the functions of the image decoding system X2 are implemented in a single device. However, this is a mere implementation example. The present invention is effective as long as signals are input/output as illustrated in the configuration examples included in the present specification even if the functions are implemented by different devices. In other words, the present invention is effective even when the image encoding system X1 and the image decoding system X2 are each implemented by two or more devices, and functions thereof are allocated to the two or more devices.

(D-7) In all the embodiments described above, differences in process between color components are not specifically mentioned. In all the embodiments, it is possible to use a same dynamic range for all the color components, or it is also possible to use different dynamic ranges for different color components.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. An encoding device that encodes an input image, the encoding device comprising:
   a processor; and
   a non-transitory storage medium containing program instructions stored thereon, execution of which by the processor causes the encoding device to provide functions of:
      a region-of-interest information setting execution unit configured to set a region of interest corresponding to the input image, and output, as an intermediate image, data in which the input image is associated with region-of-interest information,
      an embedding position designation unit configured to designate an embedding position of the region-of-interest information in the intermediate image,
      a region-of-interest information embedding unit including
         a region-of-interest information addition unit configured to find a region including all pixels into which the region-of-interest information is embedded in the intermediate image in accordance with the embedding position, add the region to the region-of-interest information as an additional region of interest, and output, as a region-of-interest addition image, data in which the intermediate image is associated with the region-of-interest information, and a region-of-interest information embedding execution unit configured to embed the region-of-interest information in the pixel value form into the region-of-interest addition image in accordance with the embedding position, and output, as the region-of-interest setting image, the region-of-interest addition image into which the region-of-interest information is embedded, and an encoding unit configured to encode the region-of-interest setting image by using a predetermined image coding scheme, and output an encoded image resulted therefrom.

2. The encoding device according to claim 1, wherein the region-of-interest information embedding unit embeds the region-of-interest information in the pixel value form into the region-of-interest addition image, the region-of-interest information including a mark for specifying the embedding position.

3. The encoding device according to claim 1, wherein
the region-of-interest information setting execution unit sets the region-of-interest information including frame type information for determining whether or not the input image is a key frame, and coordinate information indicating a position of the region of interest, and
the region-of-interest information embedding unit embeds the region-of-interest information in the pixel value form into the region-of-interest addition image in accordance with the embedding position in a case where the input image is a non key frame.

4. The encoding device according to claim 1, wherein
one or more pieces of real data indicating regions are managed in a table in association with indices among the encoding device and a decoding device corresponding to the encoding device, and
the region-of-interest information embedding unit specifies an index corresponding to a piece of the real data indicating the region of interest, as the region-of-interest information, and embeds the specified index in a pixel value form into the region-of-interest addition image.

5. The encoding device according to claim 1, wherein the region-of-interest information embedding unit embeds a pixel value into a plurality of pixel groups that do not overlap each other, the pixel value representing information embedded into the region-of-interest addition image, the pixel groups having sizes.

6. The encoding device according to claim 1, wherein, in a case where a number of bits of the pixel value is an integer value N, embedded information is X, and the number of bits of X is an integer value n that is less than or equal to N,
the region-of-interest information embedding unit forms a pixel value representing the embedded information by inputting X into upper n bits among the N bits, inputting 1 into an (n+1)-th bit from the most significant bit, and inputting 0 into the other bits.

7. The encoding device according to claim 6, wherein, in a case where the number of bits of the pixel value is the integer value N, embedded information is X, and the number of bits of X is 1,
the region-of-interest information embedding unit forms a pixel value representing the embedded information by inputting X into the most significant bit among the N bits, inputting 1 into a second bit from the most significant bit, and inputting 0 into the other bits.

8. The encoding device according to claim 1, wherein, in a case where a number of bits of the pixel value is an integer value N, embedded information is X, and the number of bits of X is an integer value n that is less than or equal to N,
the region-of-interest information embedding unit forms a pixel value representing the embedded information by inputting X into lower n bits of Y, and leaving upper (N−n) bits of Y unchanged, where Y is a pixel value of an embedding target pixel in the region-of-interest addition image.

9. The encoding device according to claim 1, wherein, in a case where a number of bits of the pixel value is an integer value N, embedded information is X, and the number of bits of X is an integer value n that is less than or equal to N,
the region-of-interest information embedding unit forms a pixel value representing the embedded information by inputting X into upper n bits among lower (n+m) bits of Y, leaving upper (N−(n+m)) bits of Y unchanged, inputting 1 into the most significant bit among lower m bits, and inputting 0 into the other bits among the lower m bits, where Y is a pixel value of an embedding target pixel in the region-of-interest addition image, and m is a predetermined integer value.

10. The encoding device according to claim 1, wherein the embedding position designation unit designates any of a lower right corner, a lower left corner, or an upper right corner in an image, as the embedding position.

11. The encoding device according to claim 1, wherein the embedding position designation unit adds any pixel value and sets an embedding region of a predetermined size in an image of an image size that are enlarged in advance.

12. A decoding device that decodes an encoded image in which region-of-interest information in a pixel value form is embedded, the decoding device comprising:
a processor; and
a non-transitory storage medium containing program instructions stored thereon, execution of which by the processor causes the decoding device to provide functions of:
a decoding unit configured to decode the encoded image and output a decoded image;
a region-of-interest information reading unit configured to analyze the decoded image, read the region-of-interest information, and output, as a region-of-interest information read image, data in which the decoded image is associated with the region-of-interest information; and
a post-filtering unit configured to apply a post-filter on a basis of the region-of-interest information read image, and output a post-filtered image resulted therefrom, wherein,
the region-of-interest information includes a mark for specifying an embedding position, and
the region-of-interest information reading unit specifies the embedding position of the region-of-interest information by searching the decoded image for the mark, and reads the region-of-interest information by analyzing the embedding position.

13. A decoding device that decodes an encoded image in which region-of-interest information in a pixel value form is embedded, the decoding device comprising:

a processor; and a non-transitory storage medium containing program instructions stored thereon, execution of which by the processor causes the decoding device to provide functions of:

a decoding unit configured to decode the encoded image and output a decoded image;

a region-of-interest information reading unit configured to analyze the decoded image, read the region-of-interest information, output, as a region-of-interest information read image, data in which the decoded image is associated with the region-of-interest information; and a post-filtering unit configured to apply a post-filter on a basis of the region-of-interest information read image, and output a post-filtered image resulted therefrom, wherein, in a case where the region-of-interest information includes frame type information, the region-of-interest information reading unit determines whether or not the decoded image includes a mark, in a case where the decoded image does not include the mark, the region-of-interest information reading unit determines that the decoded image is a key frame, and in a case where the decoded image includes the mark, the region-of-interest information reading unit determines that the decoded image is a non key frame and reads the region-of-interest information.

14. The decoding device according to claim 12, wherein one or more pieces of real data indicating regions are managed in a table in association with indices among the decoding device and an encoding device corresponding to the decoding device, and the region-of-interest information reading unit analyzes the decoded image, reads an index as the region-of-interest information, and specifies a region corresponding to the index as a region of interest by using the table.

15. The decoding device according to claim 12, wherein the execution of the program instructions by the processor causes the decoding device to further provide functions of:

an embedding hiding unit configured to output, as an output image, an embedding hiding image obtained by hiding a region in which information in a pixel value form is embedded in the post-filtered image, from a screen.

16. The decoding device according to claim 15, wherein the embedding hiding unit generates the embedding hiding image by performing a process of cutting out the region into which the information in the pixel value form is embedded in the post-filtered image, from the screen.

17. The decoding device according to claim 12, wherein the region-of-interest information reading unit analyzes the decoded image and performs reading on a basis of a statistical value of pixel values of one or more pixels included in a pixel group into which a pixel value representing embedded information may be embedded.

18. An image processing method of an image processing system including an encoding device and a decoding device, the method comprising:

by the encoding device, setting a region of interest corresponding to an input image, outputting, as an intermediate image, data in which the input image is associated with region-of-interest information, designating an embedding position of the region-of-interest information in the intermediate image, finding a region including all pixels into which the region-of-interest information is embedded in the intermediate image in accordance with the embedding position, adding the found region to the region-of-interest information as an additional region of interest, outputting, as a region-of-interest addition image, data in which the intermediate image is associated with the region-of-interest information, embedding the region-of-interest information in a pixel value form into the region-of-interest addition image in accordance with the embedding position, outputting, as the region-of-interest setting image, the region-of-interest addition image into which the region-of-interest information is embedded, encoding the region-of-interest setting image by using a predetermined image coding scheme, and outputting an encoded image obtained through the encoding; and, by the decoding device, decoding the encoded image obtained from the encoding device, outputting a decoded image obtained through the decoding, analyzing the decoded image, reading the region-of-interest information, outputting, as a region-of-interest information read image, data in which the decoded image is associated with the region-of-interest information, applying a post-filter on a basis of the region-of-interest information read image, and outputting a post-filtered image after applying the post-filter.

* * * * *